United States Patent
Beyfuss et al.

[11] Patent Number: 6,106,155
[45] Date of Patent: Aug. 22, 2000

[54] BEARING PLATE

[75] Inventors: Berthold Beyfuss, Kaisten; Burkhard Buchheim, Schweinfurt; Hans-Jürgen Friedrich, Römershofen; Peter Horling, Mainberg; Manfred Karl; Jürgen Storzenberger, both of Schweinfurt, all of Germany

[73] Assignee: SKF GmbH, Schweinfurt, Germany

[21] Appl. No.: 09/247,517

[22] Filed: Feb. 10, 1999

[30] Foreign Application Priority Data

Feb. 10, 1998 [DE] Germany ............ 198 05 237

[51] Int. Cl.⁷ ............................. F16C 35/04
[52] U.S. Cl. ........................ 384/537; 384/538
[58] Field of Search ................. 384/537, 575, 384/538

[56] References Cited

U.S. PATENT DOCUMENTS

| | | | |
|---|---|---|---|
| 1,927,523 | 9/1933 | Mitchell | 384/537 |
| 2,467,994 | 4/1949 | Ruist | 384/537 |
| 2,686,088 | 8/1954 | Neslon, Jr. | 384/537 |
| 2,794,691 | 6/1957 | Noe | 384/537 |
| 2,796,304 | 6/1957 | Downs | 384/537 |
| 3,950,046 | 4/1976 | Lubbersmeyer | 308/190 |
| 4,640,632 | 2/1987 | Brandenstein et al. | 384/537 |
| 4,645,361 | 2/1987 | Lakin | 384/537 X |
| 5,048,661 | 9/1991 | Toye | 384/537 |

FOREIGN PATENT DOCUMENTS 973619  10/1964  United Kingdom.

OTHER PUBLICATIONS

Derwent–Acc–No. 1979–87757B—Deep Drawing Press for Dished Workpieces–, Aug. 1979.
Derwent–Acc–No. 1993–176587—Bearing Inserted in Deep Drawn Cylinder of Motor, Aug. 1979.

*Primary Examiner*—Khoi Q. Ta
*Attorney, Agent, or Firm*—Burns, Doane, Swecker & Mathis, L.L.P.

[57] ABSTRACT

A bearing plate formed from sheet metal to hold at least two rolling bearings in closely adjoining relation includes a pair of seat surfaces between which is located a ridge. The ridge is positioned in the area of the narrowest point between the outside rings of the rolling bearings and is pulled from the seat surfaces generally in the axial direction. The ridge axially increases in width with curved transition areas that merge with the seat surfaces.

13 Claims, 1 Drawing Sheet

BEARING PLATE

This application corresponds to and claims priority under 35 U.S.C. § 119 with respect to German Application No. P 19805237.5 filed on Feb. 10, 1998, the entire content of which is incorporated herein by reference.

FIELD OF THE INVENTION

This invention generally relates to rolling bearings. More particularly, the present invention pertains to bearing plate used in a rolling bearing to hold at least two bearings in place.

BACKGROUND OF THE INVENTION

UK Patent Specification No. 973 619 discloses a sheet metal case used to hold rolling bearings in place. The document describes producing receptacle bores for bearing rings in the sheet metal case by deep-drawing and stamping. The case includes rounded seat surfaces that are arranged on a ring bead that helps increase stability. The bearing rings, which are intended to adjoin each other, are separated in their narrowest area by a ridge which forms part of the case. However, this ridge and the way in which it is configured greatly limits the closeness of the bearing rings in relation to each other.

Particularly in the case of bearing plate and rolling bearing assemblies used for gear sets, it is highly desirable that the axes of adjoining rolling bearings or shafts be positioned as close together as possible to optimize both space and weight.

In the case of cast and extruded bearing plate parts possessing good stability, this problem can be addressed, but the necessary type of production is more complicated and more expensive because it requires complicated forming tools, several working steps and follow-up procedures. Thus, this type of production is not well suited to the cost effective and uncomplicated manufacture of bearing plates.

In light of the foregoing, it would be desirable to provide a bearing plate which can be produced in a cost-efficient manner, which possesses reliable stability and rigidity, and which results in a spacing of the rolling bearings that is reduced to a significant extent so that the rolling bearings almost contact.

SUMMARY OF THE INVENTION

The present invention provides a bearing plate for holding at least two rolling bearings, with the bearing plate being constructed so that a ridge section exists in the area of closest approach of the outer rings of the bearing ring. The ridge section in the area of closest approach of the outer rings is pulled essentially axially from the seat surfaces, and merges from there into the overall width of the seat surface so that the transition areas on both sides steadily increase in width axially.

The deep-drawing process forms, from a sheet metal plate, tubular-shaped projections with essentially cylindrical seat surfaces for the outer rings of the rolling bearings. The outer surfaces of the outer bearing rings of the rolling bearings are positioned very close to one another, and indeed almost in touching relation, by removing the sheet metal material in the region of the bearing plate at which the outer bearing rings are located closest together. However, sheet metal material is still present in this ridge area, starting from the planar sheet metal portion on both sides and having an increasing axial width as a stabilizing ridge. The ridge profile created during deep-drawing, which is curved or folded inside itself, provides a reliable supporting connection so that the diameters of the seat surfaces do not change when pressed in, thereby ensuring the safe seating of the rolling bearings.

By producing the bearing plate from a plane sheet metal plate, it is possible to create in a single working step a bearing plate which essentially needs no further processing and is directly prepared for pressing in the rolling bearings. In contrast to massive bearing plates, this provides a significant cost advantage. Also, in comparison to existing sheet metal bearing plate constructions, this permits a closely adjoining positioning of the rolling bearings.

Another aspect of the present invention involves an assembly that includes a bearing plate and at least two rolling bearings arranged next to one another, with the rolling bearings each including an outer ring. The bearing plate is formed from sheet metal and includes two deep-drawn adjoining cylindrical seat surfaces into which are pressed the rolling bearings so that each rolling bearing is held in a respective one of the cylindrical seat surfaces. The bearing plate possesses a ridge section between the area of closest approach of the outer rings of the rolling bearings, with such ridge section being pulled essentially axially from the seat surfaces to form transition areas that gradually increase in width along an axial extent of the ridge section.

According to another aspect of the present invention, an assembly includes a bearing plate and at least two rolling bearings arranged next to one another. The bearing plate is formed from sheet metal and includes two deep-drawn adjoining cylindrical seat surfaces into which are fitted the rolling bearings so that each rolling bearing is held in a respective one of the cylindrical seat surfaces. The bearing plate possesses a ridge section between the area of closest approach of the adjoining seat surfaces that is pulled substantially axially from the seat surfaces to form transition areas that gradually increase in width along the axial extent of the ridge section. The rolling bearings each include an outer ring having an annular recess at each axial end, and the bearing plate includes portions that engage the annular recess at each axial end of each outer ring.

BRIEF DESCRIPTION OF THE DRAWING FIGURES

The foregoing and additional features and characteristics associated with the present invention will become more apparent from the following detailed description considered with reference to the accompanying drawing figures in which like elements are designated by like reference numerals and wherein.

DETAILED DESCRIPTION OF THE INVENTION

Figure 1:
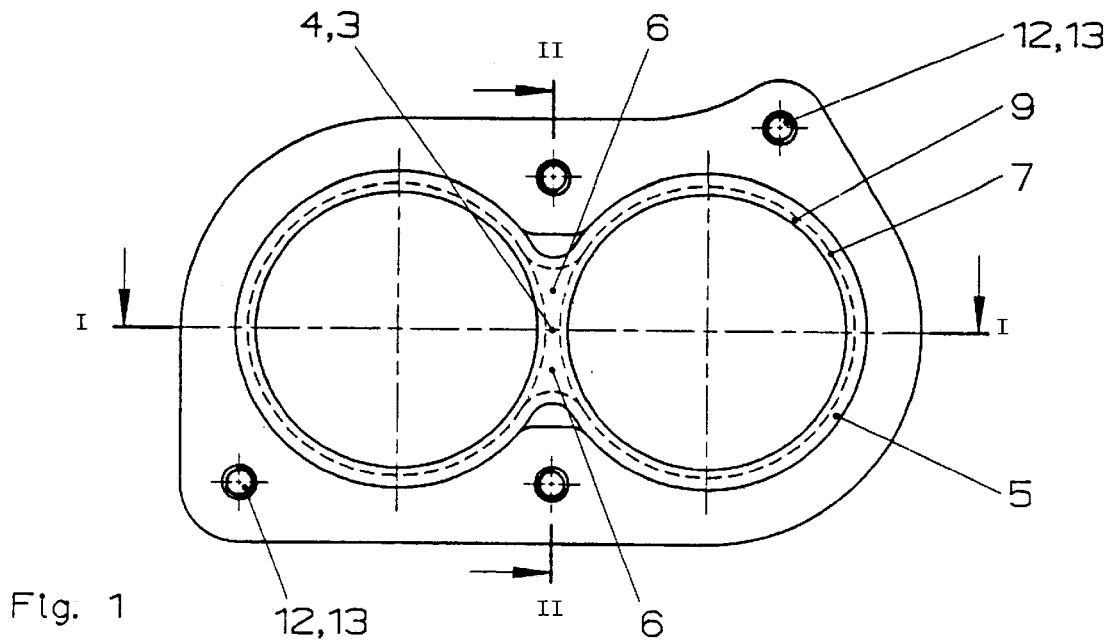
FIG. 1 is a top plan view of a bearing plate with closely adjoining seat surfaces for the rolling bearings.
Figure 2:
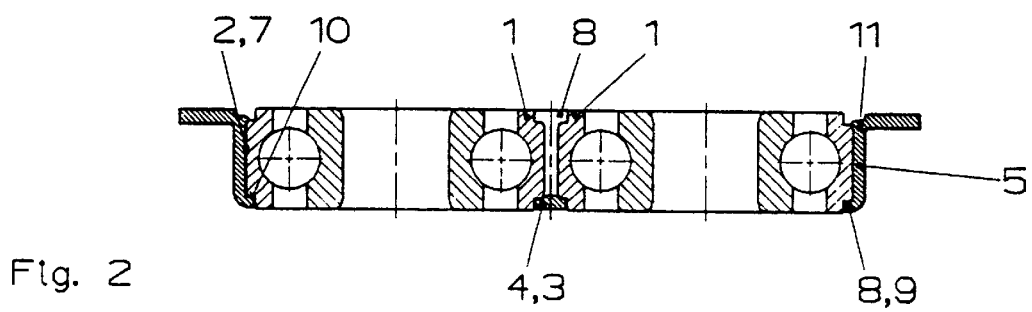
FIG. 2 is a cross-sectional view of the bearing plate shown in FIG. 1 taken along the section line I—I and illustrating the set-in place rolling bearings.
Figure 3:
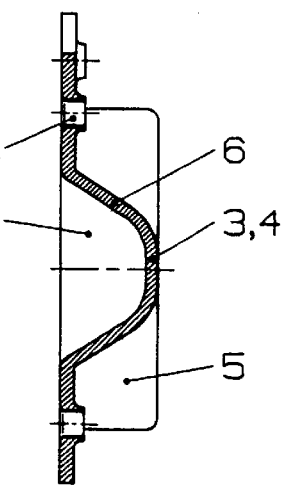
FIG. 3 is a cross-sectional view of the bearing plate shown in FIG. 1 taken along the section line II—II.

FIGS. 1–3 illustrate an assembly in accordance with the present invention that includes a bearing plate and at least two rolling bearings, with each of the rolling bearings being constituted by an outer bearing ring 1, an inner bearing ring and a plurality of rolling elements positioned between the inner and outer bearing rings. The bearing plate is adapted to hold the rolling bearings in place relative to one another.

The bearing plate of the present invention shown in FIGS. 1–3 is fabricated by deep-drawing a planar sheet metal plate. Prior to deep drawing, the sheet metal plate is formed into the desired outside shape by stamping. The sheet metal plate is also formed with stamped holes in the centers of the rolling bearing seats.

The deep drawing of the metal plate is carried out to produce a bearing plate having a pair of adjoining seat surfaces 7 which each receive one of the rolling bearings as shown in FIG. 2. The rolling bearings are pressed in place in the bearing plate. As can be seen from FIG. 2, the plate is fabricated so that in the narrowest portion of the adjoining rolling bearings (i.e., in the region of closest approach of the outer rings 1 of the rolling bearings), substantially no material of the plate remains. Only a ridge section 3 in the area 4 of the bearing plate that is still planar remains. This ridge section 3 is pulled essentially axially from the seat surfaces 7 in the area of closest approach of the outer rings 1 of the rolling bearings.

From the area 4 of the bearing plate that is still planar, which constitutes the weakest point, the width in the ridge section 3 becomes steadily wider along its axial extent and merges, as shown in FIG. 2, with the full width of the deep-drawn, tubular-shaped sections 5. This results in curved transition areas 6 having a high rigidity which keep the seat surfaces 7 that are interrupted at the weakest point dimensionally stable. It can thus be seen that from the ridge section 3, the plate gradually widens along its axial extent in a direction extending parallel to a plane that is perpendicular to the plane of the plate and that extends between the two seat surfaces (i.e., a plane containing the section line II—II and lying perpendicular to the plane of the plate), with the gradually widening transition section smoothly merging into the tubular-shaped sections 5.

As can be seen from the cross-sectional view of FIG. 2, the regions of the plate outside the ridge section 3 include the axially extending tubular-shaped section 5 situated between a radially outwardly extending section 14 and a radially inwardly turned section 9.

As seen in FIG. 2, the axial ends of the outer bearing rings are turned-out so that they possess a smaller outside diameter than the portions of the outer bearing rings 1 located between the axial ends. The ridge section 3 of the bearing plate is received in the reduced diameter portion at one axial end of the outer bearing rings 1. In the regions of the bearing plate located outside the ridge section 3, the reduced diameter portion at the one axial end of the outer bearing rings 1 receives the radially inwardly turned flange-shaped edge section 9 of the bearing plate. This forms the axial contact surfaces 10 for the corresponding outer rings 1.

The ridge section 3 can be constructed wider than would otherwise be the case because of the annular ring-shaped recesses 8 at the axial ends of the outer rings 1. The edges of the ridge section 3 are received in the annular recesses 8 at the ends of the outer rings 1. The wider ridge section 3 contributes to further increasing the dimensional stability. The annular ring-shaped recesses 8 at the ends of the outer rings 1 can be formed by turning.

The bearing plate includes a transition area 11 between the plane part 14 of the bearing plate and the seat surfaces 7. These material parts 11 of the bearing plate are designed to overlap with the annular recesses 8 as seen at the left and right portions of the assembly shown in FIG. 2 to fix the outer rings of the bearings. These parts 11 of the bearing plate are formed through use of a suitable tool which is pressed into the bearing plate in a direction from the top to the bottom of the bearing plate, as considered with reference to the illustration in FIG. 2. This pressing causes the parts 11 of the bearing plate material to flow outwardly in the direction of the annular recesses 8 to thereby produce a form fitting attachment of the outer rings 1 to the bearing plate. The pressed parts 11 of the bearing plate thus flow into and at least partially fill the annular recesses 8 at the ends of the outer rings opposite the radially inwardly turned flange-shaped edge section 9.

The bearing plate is also provided with axially extending positioning projections 12 that extend out of the plane of the bearing plate. These projections 12 can be internally threaded so that the projections constitute threaded projections 13. The projections can be threaded over their entire axial extent or over only a portion of their axial extent.

From the foregoing, it can be seen that in the portion of the assembly where the outer bearing rings 1 are located closest to one another, the plate only engages the outer bearing rings at the axial end of the outer bearing rings. The assembly according to the present invention advantageously allows the outer bearing rings to be positioned very close to one another so that the axes of the adjoining rolling bearings are positioned as close as possible togther. The bearing plate also possesses high rigidity and stability, and can be produced in a relatively cost-effective manner.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An assembly that includes a bearing plate and at least two rolling bearings arranged next to one another, the at least two rolling bearings each including an outer ring, the bearing plate being formed from sheet metal and including two deep-drawn adjoining cylindrical seat surfaces into which are pressed the rolling bearings so that each rolling bearing is held in a respective one of the cylindrical seat surfaces, said bearing plate including a ridge section between an area of closest approach of the outer rings of the rolling bearings that is pulled essentially axially from the seat surfaces to form transition areas that gradually increase in width along an axial extent of the ridge section.

2. The assembly as claimed in claim 1, wherein each of the cylindrical seat surfaces of the bearing plate includes an axially extending section and a radially inwardly turned edge section that surrounds the outer ring of the respective rolling bearing.

3. The assembly as claimed in claim 2, wherein each of the radially inwardly turned edge sections engages an annular recess at an axial end of one of the outer rings.

4. The assembly as claimed in claim 1, wherein the bearing plate includes a transition area between each seat surface and a plane part of the bearing plate, said transition areas being form fitted into annular recesses provided at axial ends of the outer rings.

5. The assembly as claimed in claim 1, wherein a planar portion of the bearing plate is provided with axially extending threaded projections.

6. An assembly that includes a bearing plate and at least two rolling bearings arranged next to one another, the bearing plate being formed from sheet metal and including two deep-drawn adjoining cylindrical seat surfaces into which are fitted the rolling bearings so that each rolling bearing is held in a respective one of the cylindrical seat surfaces, said bearing plate including a ridge section between an area of closest approach of the adjoining seat surfaces that is pulled substantially axially from the seat surfaces to form transition areas that gradually increase in width along an axial extent of the ridge section, the at least two rolling bearings each including an outer ring having an annular recess at each axial end, the bearing plate including portions that engage the annular recess at each axial end of each outer ring.

7. The assembly as claimed in claim 6, wherein each of the cylindrical seat surfaces of the bearing plate includes an axially extending section and a radially inwardly turned edge section that surrounds the outer ring of the respective rolling bearing.

8. The assembly as claimed in claim 7, wherein each of the radially inwardly turned edge sections engages one of the annular recesses at the axial end of one of the outer rings.

9. The assembly as claimed in claim 6, wherein the bearing plate includes a transition area between each seat surface and a plane part of the bearing plate, said transition areas being form fitted into one of the annular recesses at the axial ends of the outer rings.

10. The assembly as claimed in claim 6, wherein a planar portion of the bearing plate is provided with axially extending threaded projections.

11. A bearing plate formed from sheet metal for holding at least two rolling bearings in closely adjoining relation to one another, the bearing plate being formed from sheet metal and including two deep-drawn adjoining cylindrical seat surfaces for receiving the rolling bearings so that each rolling bearing is held in a respective one of the cylindrical seat surfaces, said bearing plate including a ridge section between the adjoining seat surfaces that is pulled substantially axially from the seat surfaces to form transition areas that gradually increase in width along an axial extent of the ridge section.

12. The bearing plate as claimed in claim 11, wherein each of the cylindrical seat surfaces of the bearing plate includes an axially extending section and a radially inwardly turned edge section, the radially inwardly turned edge section being provided at an end of the axially extending section.

13. The assembly as claimed in claim 11, wherein a planar portion of the bearing plate is provided with axially extending threaded projections.

* * * * *